(12) United States Patent
Jaussi et al.

(10) Patent No.: US 7,164,721 B2
(45) Date of Patent: Jan. 16, 2007

(54) SIMULTANEOUS BIDIRECTIONAL SIGNAL SUBTRACTION

(75) Inventors: James E. Jaussi, Hillsboro, OR (US); Bryan K. Casper, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 878 days.

(21) Appl. No.: 10/326,758

(22) Filed: Dec. 20, 2002

(65) Prior Publication Data
US 2004/0120405 A1 Jun. 24, 2004

(51) Int. Cl.
*H04B 3/00* (2006.01)
*G01R 19/00* (2006.01)
(52) U.S. Cl. .......................................... 375/257; 327/28
(58) Field of Classification Search ................ 375/257, 375/224; 327/28, 74, 103, 156, 157; 330/353
See application file for complete search history.

(56) References Cited

U.S. PATENT DOCUMENTS 5,557,220 A * 9/1996 Araya et al. .................. 327/28
6,320,435 B1 * 11/2001 Tanimoto ..................... 327/156
2001/0045849 A1 * 11/2001 Kurita ........................ 327/156

OTHER PUBLICATIONS

Yeung, Evelina et al. "A 2.4 Gb/s/pin Simultaneous Bidirectional Parallel Link with Per-Pin Skew Compensation", IEEE Journal of Solid-State Circuits, vol. 35, No. 11, Nov. 2000, 0018-9200. Page 1619-1628.

* cited by examiner

*Primary Examiner*—Khai Tran
(74) *Attorney, Agent, or Firm*—Buckley, Maschoff & Talwalkar LLC (57) ABSTRACT

According to some embodiments, a circuit is adapted to convert a first voltage signal from a bidirectional signal line to a first current signal, the first voltage signal to represent first data transmitted from a first transmitter and second data transmitted from a second transmitter. The circuit may be further operable to convert a second voltage signal to a second current signal, the second voltage signal, substantially to represent the first data, and to generate a first output signal to represent the second data based on the second current signal and the first current signal. Such a circuit might be an element of a simultaneous bidirectional signaling transceiver.

15 Claims, 7 Drawing Sheets

SIMULTANEOUS BIDIRECTIONAL SIGNAL SUBTRACTION

BACKGROUND

Data may be transmitted between devices using many signaling protocols. According to a simultaneous bidirectional signaling protocol, a first device transmits signals to a second device over a signal line and also receives signals from the second device over the signal line. Since the same signal line carries both signals, each device requires a technique to distinguish the signal transmitted by the device from the signal transmitted to the device.

A device may distinguish a first signal transmitted by the device from a second signal transmitted to the device by subtracting the first signal from a composite signal that is present on the signal line. According to this technique, the device receives the composite signal from the signal line, subtracts a duplicate version of the first signal from the composite signal using capacitor-based subtraction circuits, and outputs the result of the subtraction. The result is intended to be substantially identical to the second signal transmitted to the device.

However, the above-mentioned capacitor-based subtraction circuits yield approximately 6 dB of attenuation and are often unable to operate at desired data rates.

DETAILED DESCRIPTION

Single-Ended Example

Figure 1:
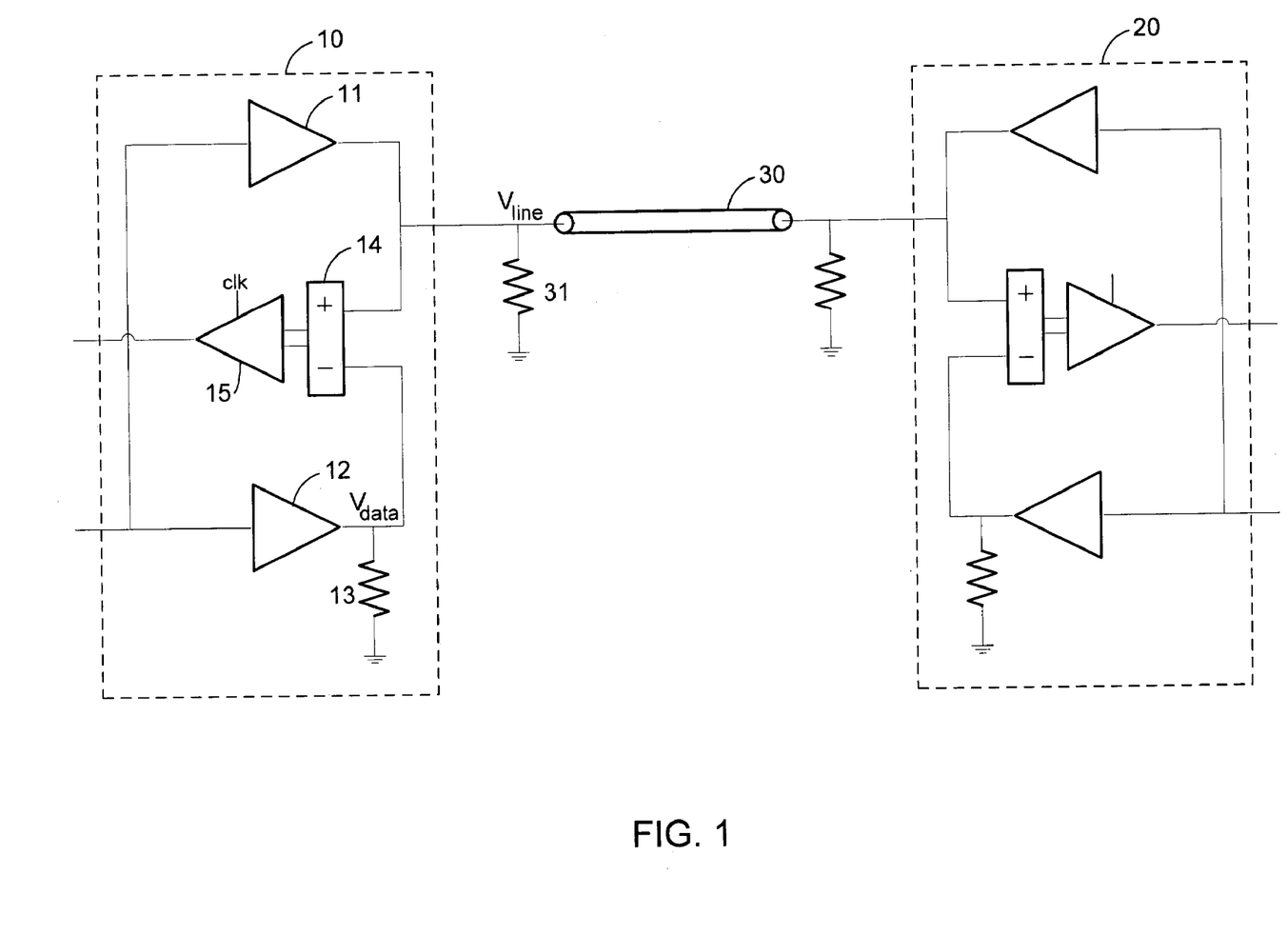
FIG. 1 is a diagram illustrating a single-ended simultaneous bidirectional signaling system according to some embodiments.

FIG. 1 is a diagram illustrating a single-ended simultaneous bidirectional signaling system according to some embodiments. FIG. 1 shows transceiver 10 coupled to transceiver 20 via signal line 30. In some embodiments, transceiver 10 and transceiver are located within respective integrated circuit packages. Each of transceiver 10 and transceiver 20 may be elements of any system adapted to communicate according to a simultaneous bidirectional signaling protocol. As described above, transceiver 10 is therefore adapted to transmit signals to transceiver 20 and to receive signals from transceiver 20 over signal line 30. Transceiver 20 is also adapted to transmit signals to transceiver 10 and to receive signals therefrom over signal line 30.

Turning to the illustrated elements of transceiver 10, transmitter 11 is adapted to receive data to be transmitted. The data is binarily-encoded in a voltage signal according to some embodiments, and transmitter 11 comprises a voltage-to-current converter to convert the voltage signal to a current signal. The current signal is transmitted to signal line 30 and contributes to voltage signal $V_{line}$ across termination resistor 31. In this regard, an impedance of termination resistor 31 may match an impedance of signal line 31 so as to reduce reflections within signal line 30.

Replica driver 12 also receives a voltage signal that binarily encodes the data to be transmitted. Replica driver 12 is, in some embodiments, a voltage-to-current converter substantially identical to transmitter 11. Accordingly, replica driver 12 is adapted to convert the received voltage signal to a current signal and to output the current signal, which in turn develops voltage signal $V_{data}$ across resistor 13. Voltage signals $V_{line}$ and $V_{data}$ thereby both represent the data to be transmitted.

Voltage signal $V_{line}$ also represents data transmitted to transceiver 10 by transceiver 20 over signal line 30. Specifically, transceiver 20 also transmits a current signal encoding binary data over signal line 30. The transmitted current signal contributes to a voltage across resistor 31 as does the current signal transmitted by transmitter 11. Voltage signal $V_{line}$ therefore represents both the data transmitted by and the data transmitted to transceiver 10.

Subtraction circuit 14 is adapted to receive voltage signals $V_{line}$ and $V_{data}$. More particularly, subtraction circuit 14 is adapted to convert $V_{line}$ to a first current signal, to convert $V_{data}$ to a second current signal, and to generate an output signal based on the second current signal and the first current signal. Since $V_{line}$ represents data transmitted by transceiver 10 as well as data transmitted by transceiver 20, and since $V_{data}$ substantially represents the data transmitted from transceiver 10, the generated output signal substantially represents the data transmitted by transceiver 20. In other words, subtraction circuit 14 decodes $V_{line}$ so as to substantially obtain a signal representing data transmitted by transceiver 20. The data transmitted by transceiver 20 may therefore be determined in some embodiments from the generated output signal.

Receiver 15 is adapted to receive the output signal from subtraction circuit 14. Receiver 15 may comprise a latch to store the output signal and to output the signal in response to a clock pulse. Receiver 15 may also be adapted to amplify the output signal to a desired signaling level.

Although the elements of transceiver 20 appear identical to the elements of transceiver 10, in some embodiments transceiver 20 may comprise any system adapted to provide simultaneous bidirectional signaling services.

Figure 2:
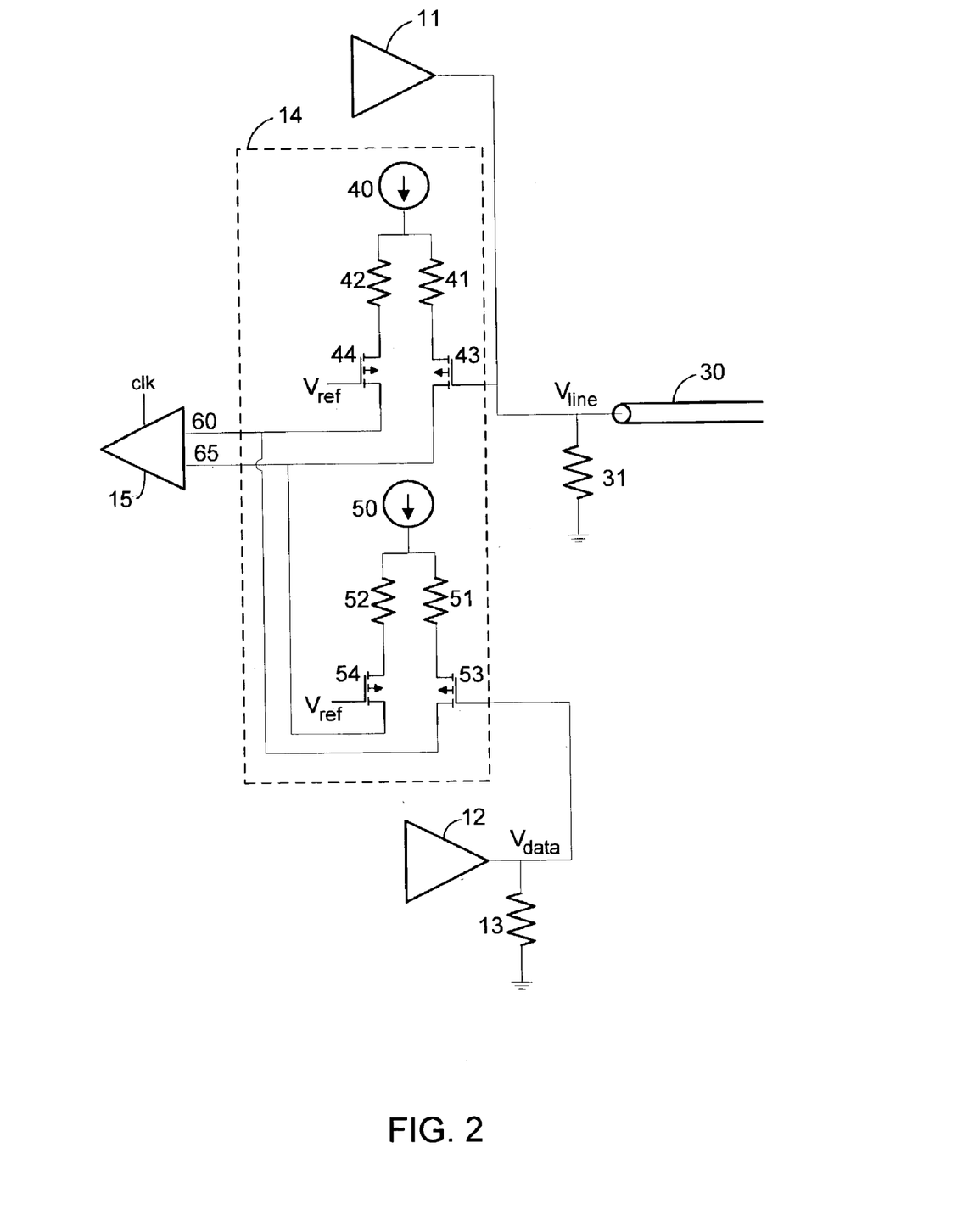
FIG. 2 is a diagram of a subtraction circuit according to some embodiments.

FIG. 2 is a diagram of subtraction circuit 14 according to some embodiments. Subtraction circuit 14 comprises bias current source 40 coupled to resistor 41 and resistor 42. Resistor 41 and resistor 42 are also coupled, respectively, to a source terminal of p-channel metal oxide semiconductor (PMOS) transistor 43 and PMOS transistor 44. A gate terminal of transistor 43 is coupled to an output line of transmitter 11. Accordingly, voltage signal $V_{line}$ is applied to the gate terminal of transistor 43. A reference voltage signal $V_{ref}$ is applied to a gate terminal of transistor 44.

By virtue of the illustrated configuration, current signals are output via drain terminals of transistors 43 and 44. The current signal output via the drain terminal of transistor 44 represents the data that is represented by voltage signal $V_{line}$. The current signal output via the drain terminal of transistor 43 also represents data that is represented by voltage signal $V_{line}$, but is reverse-polarized with respect to the current signal output via the drain terminal of transistor 44 and a value of bias current source 40.

Subtraction circuit 14 also includes bias current source 50. Bias current source 50 is coupled to resistor 51 and resistor 52, which are respectively coupled to a source terminal of PMOS transistor 53 and PMOS transistor 54. A gate terminal of transistor 53 is coupled to an output line of replica transmitter 12. Accordingly, voltage signal $V_{data}$ is applied to the gate terminal of transistor 53. A reference voltage signal $V_{ref}$ is applied to a gate terminal of transistor 54.

Drain terminals of transistors 53 and 54 output current signals corresponding to voltage signal $V_{data}$. As described above with respect to voltage signal $V_{line}$, the current signal output via the drain terminal of transistor 54 represents data that is represented by voltage signal $V_{data}$. The current signal output via the drain terminal of transistor 53 is a reverse-polarized version of the current signal output via the drain terminal of transistor 54, and therefore also represents data that is represented by voltage signal $V_{data}$.

The drain terminal of transistor 44 is coupled to the drain terminal of transistor 53 at a node and line 60 is in turn coupled to the node. Since combining two currents onto a single line results in an addition of the two currents, line 60 carries a current signal equal to a sum of the two current signals output from the drain terminal of transistor 44 and the drain terminal of transistor 53. Moreover, because the current signal output from the drain terminal of transistor 53 is a reverse-polarized representation of the current signal output via the drain terminal of transistor 54, the current signal carried by line 60 is substantially equal to a difference between the current signal output from the drain terminal of transistor 44 and the current signal output via the drain terminal of transistor 54.

The current signal output via the drain terminal of transistor 54 represents the data input to transmitter 12, and the current signal output from the drain terminal of transistor 44 represents both the data input to transmitter 11 and the data transmitted by transceiver 20. Accordingly, a difference between these two current signals is a current signal representing the data transmitted by transceiver 20.

Line 65 carries a sum of the two current signals output from the drain terminal of transistor 43 and the drain terminal of transistor 54. Again, the current signal output from the drain terminal of transistor 43 is a reverse-polarized current signal converted from voltage signal $V_{line}$ (encoding the data input to transmitter 11 and the data transmitted by transceiver 20), while the current signal output from the drain terminal of transistor 54 is a current signal converted from voltage signal $V_{data}$ (encoding the data transmitted from transceiver 20). Consequently, the summed current signal carried by line 65 is a reverse-polarized current signal that represents the data transmitted by transceiver 20.

Lines 60 and 65 are coupled to receiver 15. Receiver 15 may comprise a current latch adapted to amplify the currents received from lines 60 and 65 to an appropriate signaling level. As such, receiver 15 amplifies a difference between the two received currents. The amplified difference output from receiver 15 therefore represents the data transmitted by transceiver 20. In some embodiments, receiver 15 comprises subtraction circuit 14.

Figure 3:
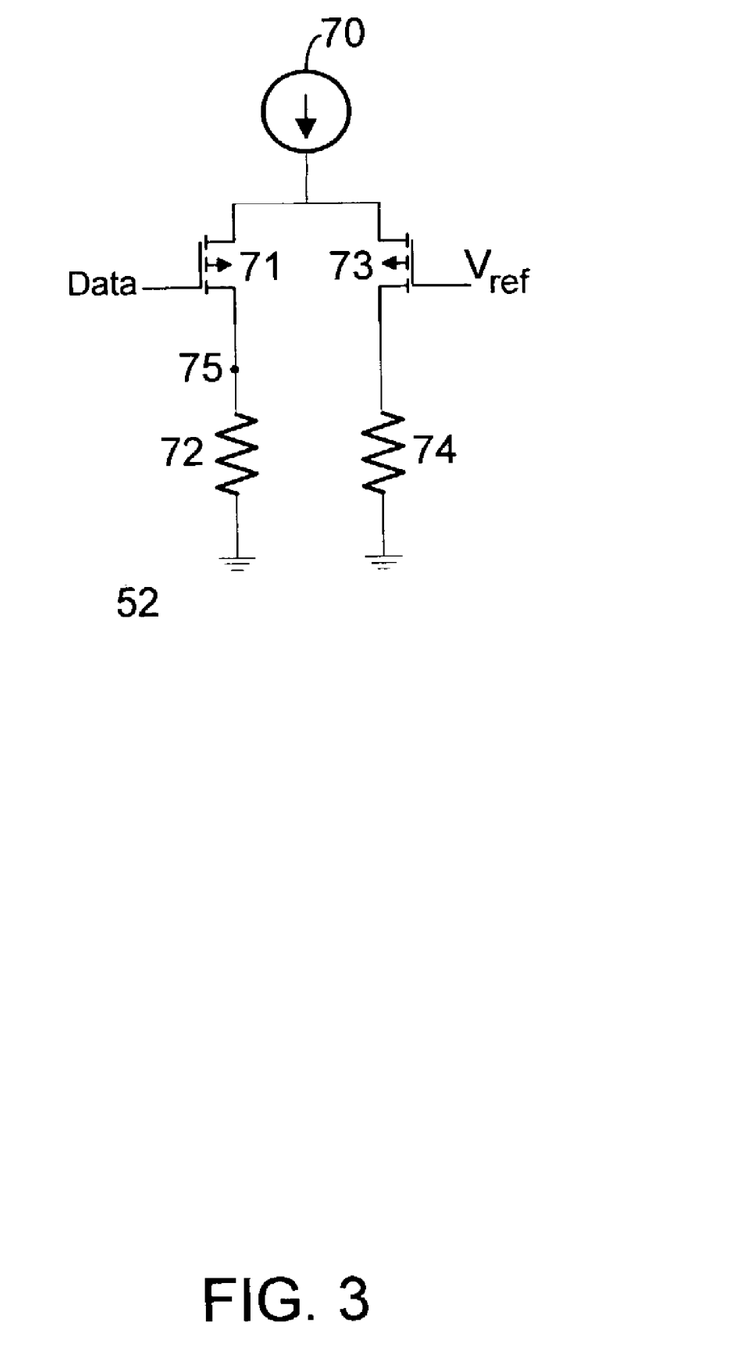
FIG. 3 is a diagram of a current driver adapted to transmit a single-ended data signal according to some embodiments.

FIG. 3 illustrates a current driver adapted to transmit a single-ended data signal according to some embodiments. The illustrated current driver may be used by transmitter 11 and/or replica driver 12. Of course, other current drivers may be used in accordance with some embodiments.

The illustrated current driver includes bias current source 70 coupled to a source terminal of PMOS transistor 71. A voltage signal of binarily-encoded data to be transmitted is applied to a gate terminal of transistor 71, and resistor 72 is coupled to a drain terminal. Similarly, a source terminal of PMOS transistor 73 is coupled to bias current source 70, a gate terminal of transistor 73 is coupled to a reference voltage signal $V_{ref}$, and a drain terminal is coupled to resistor 74. Each of resistors 72 and 74 are also coupled to ground.

Upon application of a voltage signal representing data to the gate terminal of transistor 71, a corresponding current signal is emitted from the drain terminal of transistor 71. In a case that FIG. 3 illustrates transmitter 11, resistor 72 corresponds to resistor 31 and voltage signal $V_{line}$ is developed at node 75. Similarly, resistor 72 corresponds to resistor 13 and voltage signal $V_{data}$ is developed at node 75 in a case that FIG. 3 illustrates replica transmitter 12.

Differential-Mode Example

Figure 4:
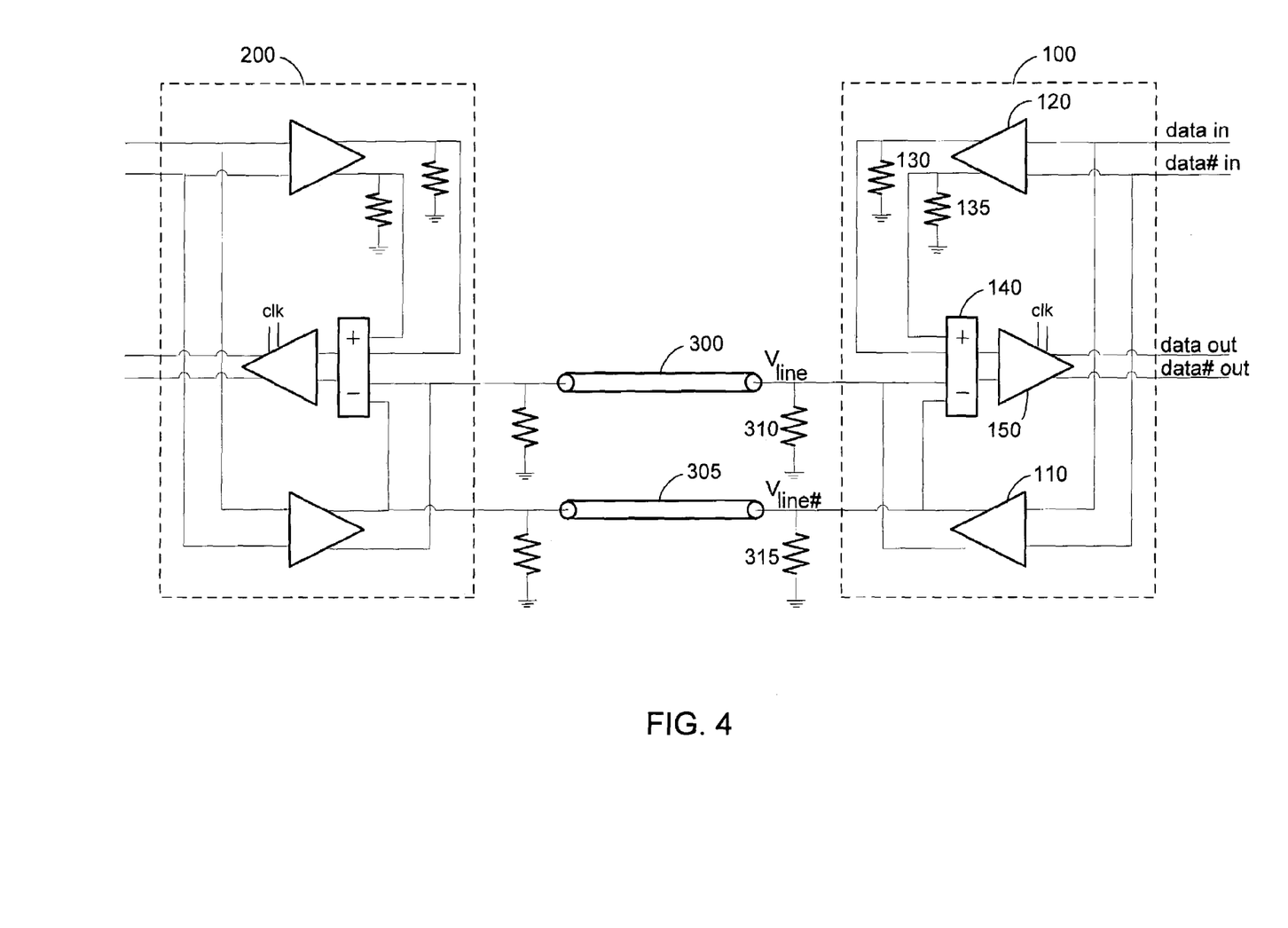
FIG. 4 is a diagram illustrating a differential-mode simultaneous bidirectional signaling system according to some embodiments.

FIG. 4 illustrates a differential-mode simultaneous bidirectional signaling system according to some embodiments. FIG. 4 shows transceiver 100 coupled to transceiver 200 via differential signal lines 300 and 305. As described with respect to FIG. 1, transceiver 100 and transceiver 200 may be located on respective integrated circuit packages and may be elements of any system adapted to communicate according to a simultaneous bidirectional signaling protocol.

Transmitter 110 of transceiver 100 is adapted to receive data to be transmitted. The data is encoded in two voltage signals carried by respective differential signal lines to transmitter 110. In some embodiments, transmitter 110 comprises a voltage-to-current converter to convert the voltage signals to differential current signals that also encode the data. The current signals are transmitted to signal lines 300 and 305, and therefore develop voltage signals $V_{line}$ and $V_{line\#}$ across respective termination resistors 310 and 315. As mentioned above, impedances of termination resistors 310 and 315 may match impedances of the signal line to which they are respectively coupled so as to reduce reflections within the signal line.

Replica driver 120 is adapted in some embodiments to receive the differential voltage signals encoding the data, to convert the received voltage signals to differential current signals encoding the data, and to output the current signals. The output current signals develop voltage signals $V_{data}$ and $V_{data\#}$ across respective resistors 130 and 135. Differential voltage signal pairs ($V_{line}$, $V_{line\#}$) and ($V_{data}$, $V_{data\#}$) thereby both represent the data to be transmitted. Voltage signal pair ($V_{line}$, $V_{line\#}$), however, also represents data transmitted to transceiver 100 by transceiver 200 over signal lines 300 and 305.

Subtraction circuit 140 is adapted to receive differential voltage signal pairs ($V_{line}$, $V_{line\#}$) and ($V_{data}$, $V_{data\#}$). Subtraction circuit 140 is further adapted to convert $V_{line}$ to a first current signal, to convert $V_{data}$ to a second current signal, to convert $V_{line\#}$ to a third current signal, and to convert $V_{data\#}$ to a fourth current signal, and to generate two differential-mode current output signals respectively based on the first and second current signals and on the third and fourth current signals. The two output signals, in conjunction with one another, represent the data transmitted by transmitter 110. As similarly described with respect to FIG. 1, the voltage signal pair ($V_{line}$, $V_{line\#}$) represents data transmitted by transceiver 100 as well as data transmitted by transceiver 200. Since voltage signal pair ($V_{data}$, $V_{data\#}$) substantially represents the data transmitted from transceiver 100, the differential-mode current output signal pair ($V_{line}$-$V_{data}$, $V_{line\#}$-$V_{data\#}$) substantially represents the data transmitted by transceiver 200.

Receiver 150 is adapted to receive the differential-mode output signals from subtraction circuit 140. Receiver 150 may comprise a latch to amplify the output signals to a desired signaling level, to store the output signals and to output the signals in response to a differential-mode clock.

Figure 5:
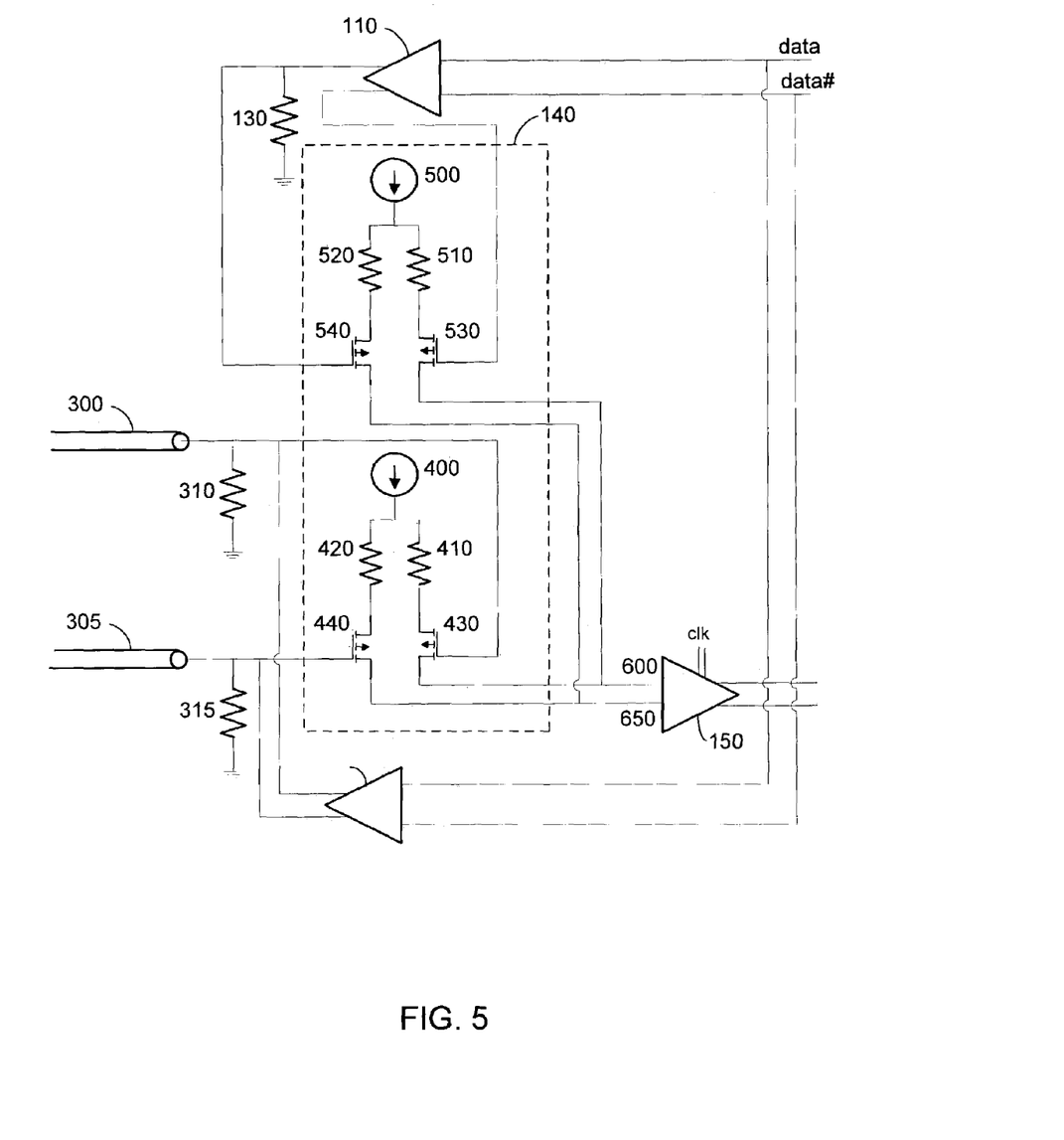
FIG. 5 is a diagram of a subtraction circuit according to some embodiments.

FIG. 5 is a diagram of subtraction circuit 140 according to some embodiments. Subtraction circuit 140 comprises bias current source 400 coupled to resistor 410 and to resistor 420, which are respectively coupled to a source terminal of PMOS transistor 430 and PMOS transistor 440. A gate terminal of transistor 430 is coupled to an output line of transmitter 110 such that voltage signal $V_{line}$ is applied to the gate terminal of transistor 430. A gate terminal of transistor 440 is coupled to another output line of transmitter 110, therefore voltage signal $V_{line\#}$ is applied to the gate terminal of transistor 440.

The illustrated circuit outputs current signals from drain terminals of transistors 430 and 440. The current signal output via the drain terminal of transistor 440 represents voltage signal $V_{line}$, and the current signal output via the drain terminal of transistor 430 is a reverse-polarized representation of voltage signal $V_{line\#}$.

Bias current source 500 of subtraction circuit 140 is coupled to resistor 510 and resistor 520, which are respectively coupled to a source terminal of PMOS transistor 530 and PMOS transistor 540. A gate terminal of transistor 530 is coupled to an output line of replica transmitter 120 such that voltage signal $V_{data}$ is applied to the gate terminal. Another output line of transmitter 110 is coupled to a gate terminal of transistor 540, and voltage signal $V_{data\#}$ is therefore applied to the gate terminal of transistor 540.

Drain terminals of transistors 530 and 540 output current signals corresponding to voltage signals $V_{data}$ and $V_{data\#}$. Specifically, the current signal output via the drain terminal of transistor 530 represents voltage signal $V_{data\#}$, and the current signal output via the drain terminal of transistor 540 is a reverse-polarized representation of voltage signal $V_{data}$.

The drain terminal of transistor 430 is coupled to the drain terminal of transistor 530 at a node and line 600 is in turn coupled to the node. Accordingly, line 600 carries a current signal equal to a sum of the two current signals output from the two drain terminals. The current signal output from the drain terminal of transistor 430 is a reverse-polarized current signal converted from voltage signal $V_{line\#}$, which represents one differential portion of the data input to transmitter 110 and the data transmitted by transceiver 200, while the current signal output from the drain terminal of transistor 530 is a current signal converted from voltage signal $V_{data\#}$ (representing one differential portion of the data transmitted by transceiver 200). Consequently, the summed current signal carried by line 600 is a reverse-polarized current signal that represents one of the differential data signals transmitted by transceiver 200.

Line 650 carries a sum of the two current signals output from the drain terminal of transistor 440 and the drain terminal of transistor 540. Again, the current signal output from the drain terminal of transistor 440 is converted from voltage signal $V_{line}$ (representing a second differential portion of the data input to transmitter 110 and the data transmitted by transceiver 200), while the current signal output from the drain terminal of transistor 540 is a current signal converted from voltage signal $V_{data}$ (representing a second differential portion of the data transmitted by transceiver 200). The summed current signal carried by line 650 is therefore a current signal representing a second one of the differential data signals transmitted by transceiver 200. As a result, lines 600 and 650 carry current signals that represent the differential data transmitted by transceiver 200.

Lines 600 and 650 are coupled to receiver 150. As described above, receiver 150 may comprise a current latch adapted to amplify a difference between the currents received from lines 600 and 650 to an appropriate signaling level, and may output the amplified signals in accordance with an input differential clock signal. The amplified difference thereby represents the data transmitted by transceiver 200.

Figure 6:
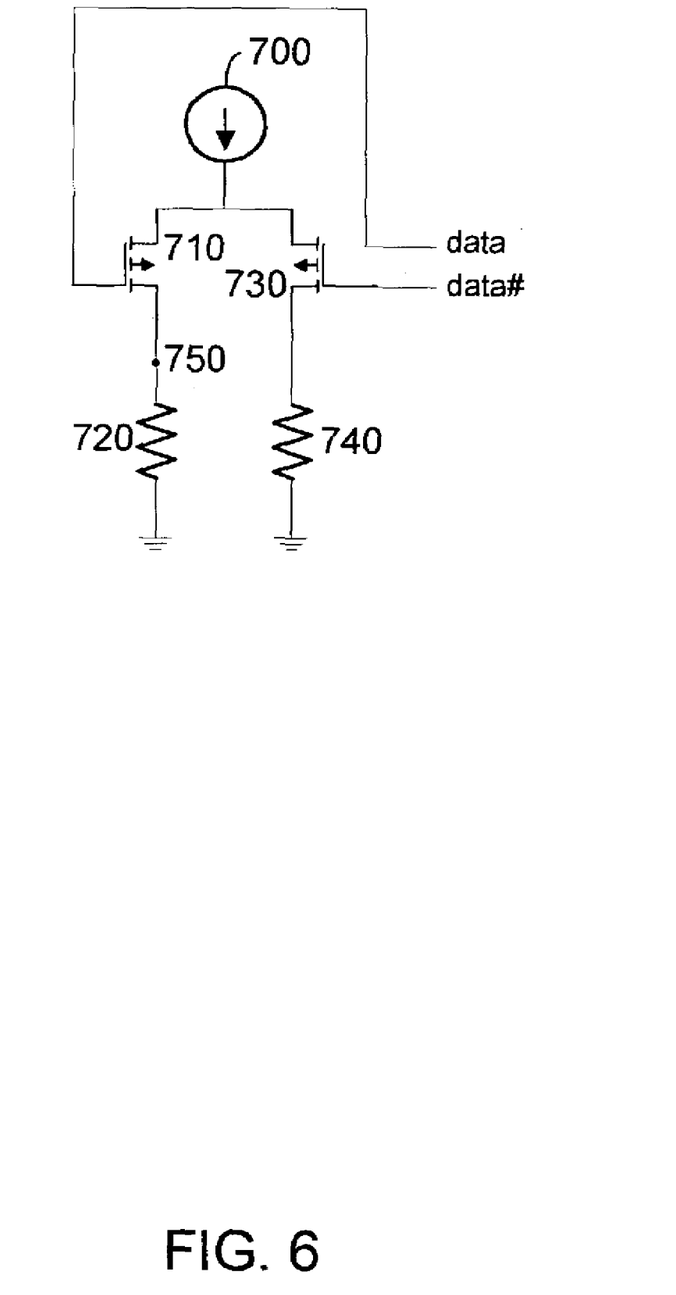
FIG. 6 is a diagram of a current driver adapted to transmit a differential-mode data signal according to some embodiments.

FIG. 6 illustrates a current driver adapted to transmit a differential-mode data signal according to some embodiments. The illustrated current driver may be used by transmitter 110 and/or replica driver 120. Of course, other differential-mode current drivers may be used in accordance with some embodiments.

The illustrated current driver includes bias current source 700 coupled to a source terminal of PMOS transistor 710. Resistor 720 is coupled to a drain terminal of transistor 710. A source terminal of PMOS transistor 730 is also coupled to bias current source 700, and a drain terminal is coupled to resistor 740. Each of resistors 720 and 740 are also coupled to ground.

Voltage signals that represent differential-mode data are applied to gate terminals of transistors 710 and 730. The gate terminal of transistor 710 receives a voltage signal encoding data, while the gate terminal of transistor 720 receives a voltage signal encoding data#. Consequently, a current signal representing data# is emitted from the drain terminal of transistor 710, and a current signal representing data is emitted from a drain of transistor 730. In a case that FIG. 6 illustrates transmitter 110, resistor 720 corresponds to resistor 310 and resistor 740 corresponds to resistor 315. Voltage signal $V_{line}$ is therefore developed at node 760, with voltage signal $V_{line\#}$ being developed at node 750. If FIG. 6 illustrates replica transmitter 120, resistor 720 corresponds to resistor 130, resistor 740 corresponds to resistor 135, voltage signal $V_{data}$ is developed at node 760, and voltage signal $V_{data\#}$ is developed at node 750.

Figure 7:
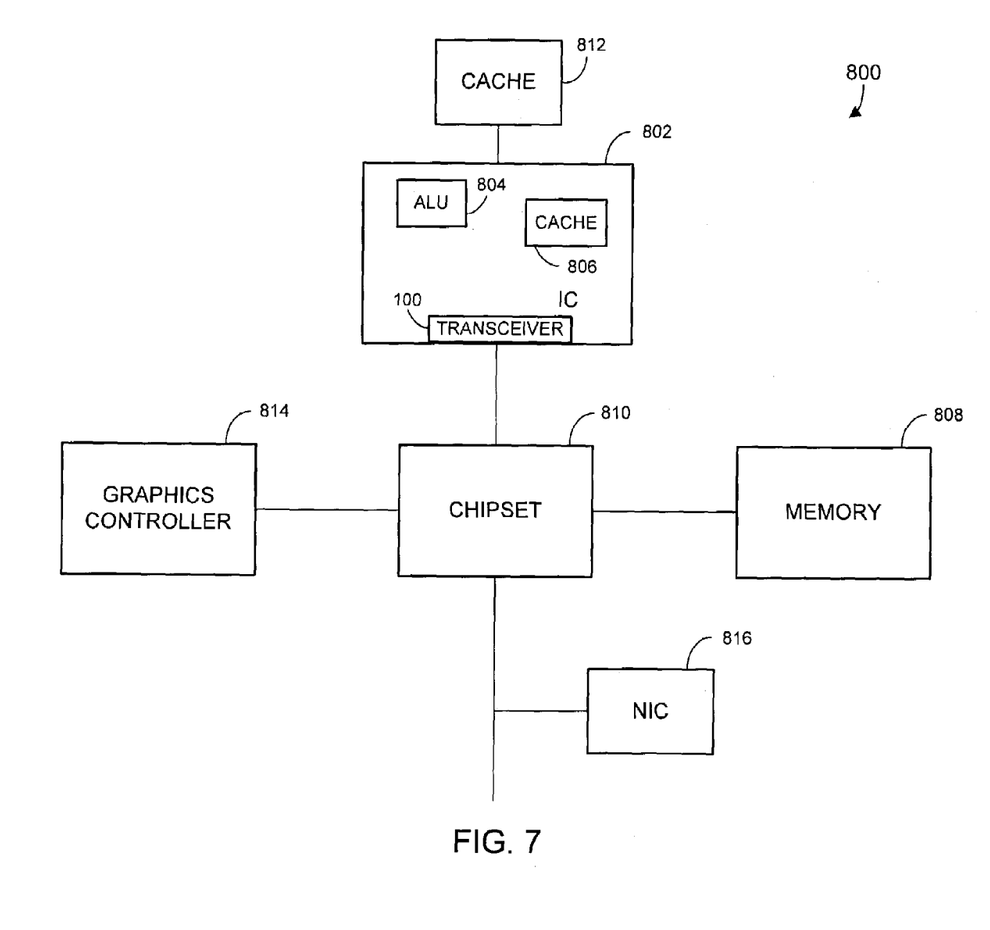
FIG. 7 is a block diagram of a system according to some embodiments.

FIG. 7 illustrates a block diagram of system 800 according to some embodiments. System 800 includes integrated circuit 802 comprising sub-blocks such as arithmetic logic unit (ALU) 804, on-die cache 806 and transceiver 100 of FIG. 4. Integrated circuit 802 may be a microprocessor or another type of integrated circuit. Integrated circuit 802 may also communicate with system memory 808 through transceiver 100, a host bus and chipset 810. According to some embodiments, integrated circuit 802 also communicates with off-die cache 812 through transceiver 100. Other off-die functional units, such as graphics controller 814 and Network Interface Controller (NIC) 816, may communicate with integrated circuit 802 via appropriate busses or ports.

Thus, embodiments may reduce attenuation of received data signals in simultaneous bidirectional signaling schemes.

The several embodiments described herein are solely for the purpose of illustration. Embodiments may include any currently or hereafter-known current drivers, voltage-to-current converters, transmitters and/or receivers. Moreover, the ground-referenced PMOS transistors described herein may be substituted with $V_{cc}$-referenced n-channel metal oxide semiconductor transistors. Therefore, persons skilled in the art will recognize from this description that other embodiments may be practiced with various modifications and alterations.

What is claimed is:

1. A circuit to convert a first voltage signal from a bidirectional signal line to a first current signal, the first voltage signal to represent first data transmitted from a first transmitter and second data transmitted from a second transmitter, to convert a second voltage signal to a second current signal, the second voltage signal substantially to represent the first data, and to subtract the second current signal from the first current signal to generate a first output signal, the first output signal to represent the second data, wherein the circuit is further adapted to convert a third voltage signal from a second bidirectional signal line to a third current signal, the third voltage signal to represent the first data and the second data in conjunction with the first voltage signal, to convert a fourth voltage signal to a fourth current signal, the fourth voltage signal substantially to represent the first data in conjunction with the second signal, and to generate a second output signal to represent, in conjunction with the first output signal, the second data based on the fourth current signal and the third current signal.

2. A circuit according to claim 1, wherein the second current signal is reverse-polarized, and wherein the circuit is further adapted to add the first current signal to the reverse-polarized second current signal to generate the output signal.

3. A circuit comprising:

a first voltage-to-current converter to convert a first voltage signal from a bidirectional signal line to a first current signal, the first voltage signal to represent first data transmitted from a first transmitter and second data transmitted from a second transmitter;

a second voltage-to-current converter to convert a second voltage signal to a second current signal, the second voltage signal substantially to represent the first data; and a first circuit to generate a first output signal to represent the second data based on the second current signal and the first current signals, wherein the first voltage-to-current converter is adapted to convert a third voltage signal from a second bidirectional signal line to a third current signal, the third voltage signal to represent the first data and the second data in conjunction with the first voltage signal, wherein the second voltage-to-current converter is adapted to convert a fourth voltage signal to a fourth current signal, the fourth voltage signal substantially to represent the first data in conjunction with the second voltage signal, and wherein the first circuit is adapted to generate a second output signal to represent, in conjunction with the first output signal, the second data based on the fourth current signal and the third current signal.

4. A circuit according to claim 3, wherein the first voltage-to-current converter comprises:

a first bias current source;
a first resistor coupled to the first bias current source;
a second resistor coupled to the first bias current source;
a first transistor, a source terminal of the first transistor coupled to the first resistor, and a gate terminal of the first transistor to receive the first voltage signal; and
a second transistor, a source terminal of the second transistor coupled to the second resistor, a gate terminal of the second transistor to receive a reference voltage signal, and a drain terminal of the second transistor to output the first current signal, and wherein the second voltage-to-current converter comprises:

a second bias current source;
a third resistor coupled to the second bias current source;
a fourth resistor coupled to the second bias current source;
a third transistor, a source terminal of the third transistor coupled to the third resistor, and a gate terminal of the third transistor to receive the second voltage signal; and
a fourth transistor, a source terminal of the fourth transistor coupled to the fourth resistor, a gate terminal of the fourth transistor to receive the reference voltage signal, and a drain terminal of the fourth transistor to output the second current signal.

5. A circuit according to claim 4, wherein the first circuit comprises:

a first node to couple the drain terminal of the second transistor to the drain terminal of the third transistor, and wherein the first output signal is provided at the first node.

6. A circuit according to claim 5, wherein the first circuit further comprises:

a second node to couple the drain terminal of the first transistor to the drain terminal of the fourth transistor, and wherein the first output signal is provided at the second node.

7. A circuit according to claim 3, wherein the second current signal is reverse-polarized, and wherein the first circuit comprises:

a first signal line to carry the first current signal, the first signal line coupled to a node;
a second signal line to carry the reverse-polarized second current signal, the second signal line coupled to the node; and
a third signal line coupled to the node, the third signal line to carry a third current signal, the third current signal substantially equal to a sum of the first current signal and the second current signal and encoding the second data.

8. A device comprising:

a transmitter to transmit a first voltage signal representing first data to a bidirectional signal line;
a replica transmitter to transmit a second voltage signal, the second voltage signal substantially representing the first data; and
a receiver to receive a third voltage signal to represent the first data and to represent second data, to receive the second voltage signal, to convert the third voltage signal to a first current signal, to convert the second voltage signal to a second current signal, and to generate a first output signal representing the second data based on the second current signal and the first current signals, wherein the transmitter is adapted to transmit a fourth voltage signal to a second bidirectional signal line, the fourth voltage signal and the first voltage signal together encoding the first data, wherein the replica transmitter is adapted to transmit a fifth voltage signal, the fifth voltage signal and the second voltage signal together representing the second data, and wherein the receiver is adapted to receive a sixth voltage signal representing, in conjunction with the third voltage signal, the first and second data, to receive the fifth voltage signal, to convert the sixth voltage signal to a third current signal, to convert the fifth voltage signal to a fourth current signal, and to generate a second output signal representing, in conjunction with the first output signal, the second data based on the fourth current signal and the third current signal.

9. A device according to claim 8,
wherein the receiver is adapted to receive the third signal from the bidirectional signal line.

10. A device according to claim 9,
wherein the second data is represented by a fourth voltage signal transmitted by a remote transmitter.

11. A device according to claim 8, wherein the receiver is adapted to subtract the second current signal from the first current signal.

12. A device according to claim 8, wherein the second current signal is reverse-polarized, and wherein the receiver is adapted to add the first current signal to the reverse-polarized second current signal.

13. A method comprising:
converting a first voltage signal from a bidirectional signal line to a first current signal, the first voltage signal to represent first data transmitted from a first transmitter and second data transmitted from a second transmitter;
converting a second voltage signal to a second current signal, the second voltage signal substantially to represent the first data;
generating a first output signal to represent the second data based on the second current signal and the first current signal;
converting a third voltage signal from a second bidirectional signal line to a third current signal, the third voltage signal to represent the first data and the second data in conjunction with the first voltage signal;
converting a fourth voltage signal to a fourth current signal, the fourth voltage signal substantially to represent the first data in conjunction with the second voltage signal; and
generating a second output signal to represent, in conjunction with the first output signal, the second data based on the fourth current signal and the third current signal.

14. A system comprising:
a chipset; and
a die comprising a microprocessor in communication with the chipset, wherein the microprocessor includes a simultaneous bidirectional transceiver comprising:
a first voltage-to-current converter to convert a first voltage signal from a bidirectional signal line to a first current signal, the first voltage signal to represent first data transmitted from a first transmitter and second data transmitted from a second transmitter;
a second voltage-to-current converter to convert a second voltage signal to a second current signal, the second voltage signal substantially to represent the first data; and a circuit to generate a first output signal to represent the second data based on the second current signal and the first current signal,
wherein the first voltage-to-current converter is adapted to convert a third voltage signal from a second bidirectional signal line to a third current signal, the third voltage signal to represent the first data and the second data in conjunction with the first voltage signal,
wherein the second voltage-to-current converter is adapted to convert a fourth voltage signal to a fourth current signal, the fourth voltage signal substantially to represent the first data in conjunction with the second voltage signal, and
wherein the first circuit is adapted to generate a second output signal to represent, in conjunction with the first output signal, the second data based on the fourth current signal and the third current signal.

15. A system according to claim 14, wherein the first voltage-to-current converter comprises:
a first bias current source;
a first resistor coupled to the first bias current source;
a second resistor coupled to the first bias current source;
a first transistor, a source terminal of the first transistor coupled to the first resistor, and a gate terminal of the first transistor to receive the first voltage signal; and
a second transistor, a source terminal of the second transistor coupled to the second resistor, a gate terminal of the second transistor to receive a reference voltage signal, and a drain terminal of the second transistor to output the first current signal,
and wherein the second voltage-to-current converter comprises:
a second bias current source;
a third resistor coupled to the second bias current source;
a fourth resistor coupled to the second bias current source;
a third transistor, a source terminal of the third transistor coupled to the third resistor, and a gate terminal of the third transistor to receive the second voltage signal; and
a fourth transistor, a source terminal of the fourth transistor coupled to the fourth resistor, a gate terminal of the fourth transistor to receive the reference voltage signal, and a drain terminal of the fourth transistor to output the second current signal.

* * * * *